Aug. 27, 1968 A. GUASTAVINO 3,399,306
PHOTOCELL ARRANGEMENT CIRCUITRY TO CHECK LONGITUDINAL
REGISTER BY PRINTING, WITH ERROR PREVISION
AND ADVANCED CORRECTIONS
Filed March 9, 1964 4 Sheets-Sheet 1
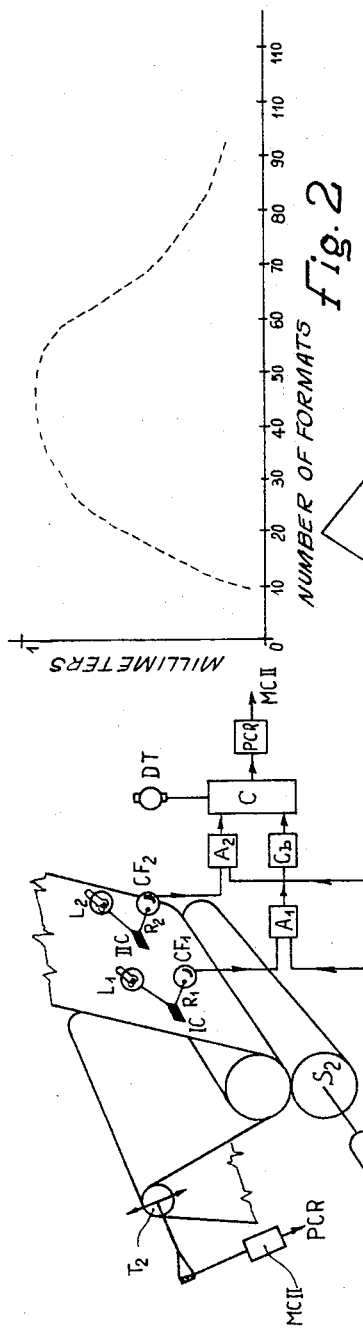
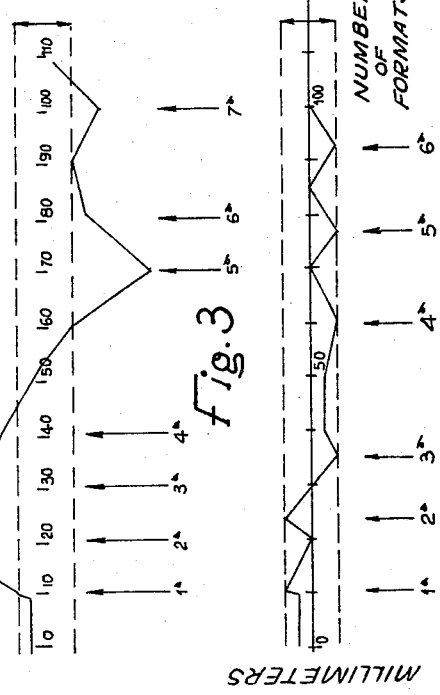
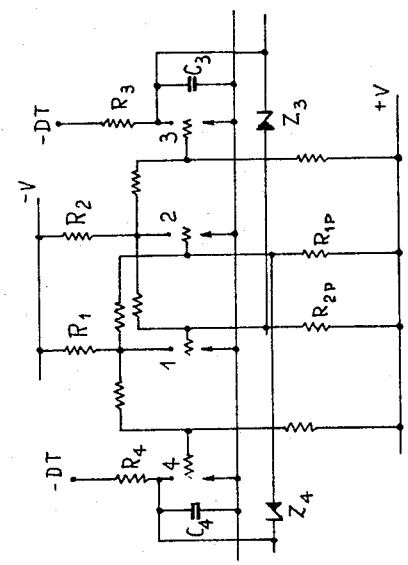
INVENTOR.
BY Antonio Guastavino

INVENTOR.

Aug. 27, 1968  A. GUASTAVINO  3,399,306
PHOTOCELL ARRANGEMENT CIRCUITRY TO CHECK LONGITUDINAL
REGISTER BY PRINTING, WITH ERROR PREVISION
AND ADVANCED CORRECTIONS
Filed March 9, 1964                                  4 Sheets-Sheet 4
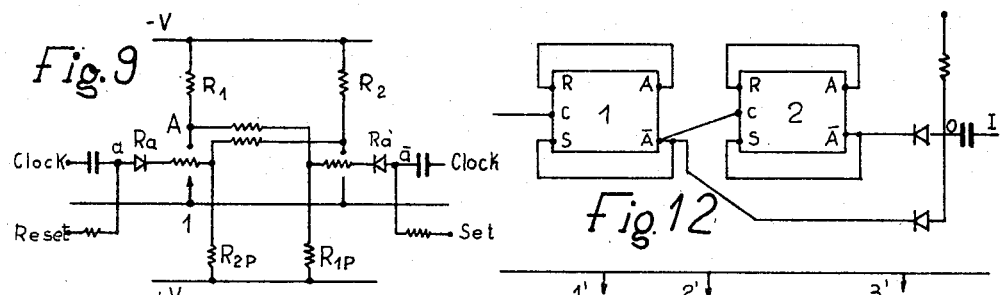
Fig. 9
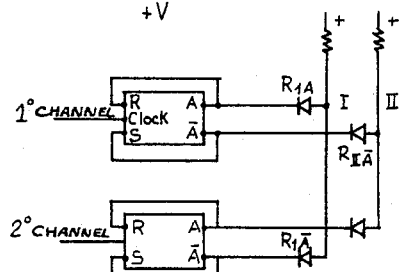
Fig. 10
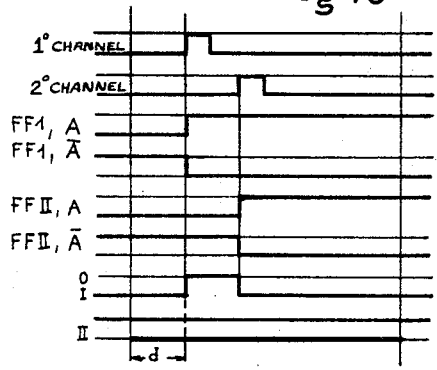
Fig. 12
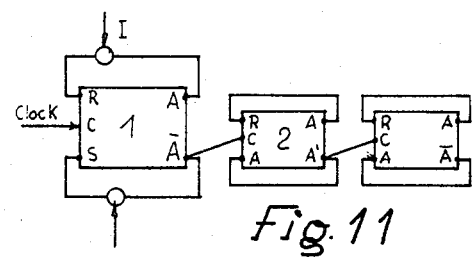
Fig. 14
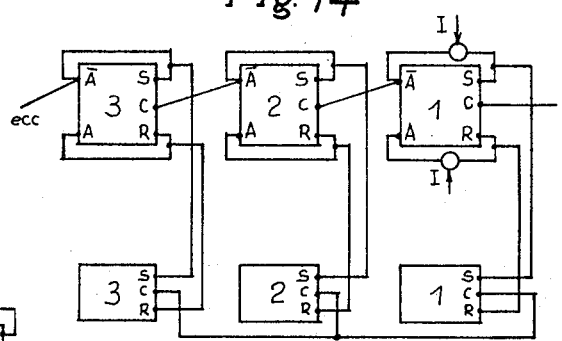
Fig. 13
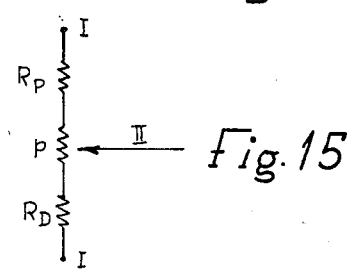
Fig. 11
Fig. 15
INVENTOR.
BY Antonio Guastavino United States Patent Office
3,399,306
Patented Aug. 27, 1968

3,399,306
PHOTOCELL ARRANGEMENT CIRCUITRY TO CHECK LONGITUDINAL REGISTER BY PRINTING, WITH ERROR PREVISION AND ADVANCED CORRECTIONS
Antonio Guastavino, Milan, Italy (% Ing. Pietro Guazzo, Via XX Settembre 74, Turin, Italy)
Filed Mar. 9, 1964, Ser. No. 350,941
Claims priority, application Italy, Mar. 13, 1963, 689,336/63
8 Claims. (Cl. 250—219)

ABSTRACT OF THE DISCLOSURE

Checking of longitudinal register in rotogravure printing machines is effected by electronically calculating the average error in two space-adjoining groups of paper formats (the errors resulting from misaligned preprinted register marks), computing a differential value between the two averages proportional to the speed in variation of the mis-register, and correcting the error as a function of the magnitude of misregister and of speed of its variation.

---

The present invention concerns a method and a device to check and correct the longitudinal register in printing with provision for advance error sensing and correction. As it is known, polychromatic images are printed in rotogravure machines by successive impression of elementary monochromatic images. The printing result depends on the perfect overlapping of the monochromatic images, that is, on the accurate registration of said images, both longitudinally (in the direction of the paper movement) and transversely (at right angles to said paper movement).

Usually the machine maintains transverse register with sufficient accuracy so that automatic check of transverse register is not needed; on the contrary this is not the case with automatic checking of longitudinal register.

However, since a correction of longitudinal register can never be immediate, an object of the invention is to foresee approximately any error which is likely to occur and to make the amount of applied correction conform to the value of the error.

Another object of the invention is to prevent any marks accidentally present on the printing sheet from actuating the device as though they were marks appearing out of place.

Another object of the invention is to permit correction of initial possible displacements between the images of two printing rollers.

Known systems of checking automatically the printing register generally operate as follows.

Besides its monochromatic image, the first printing roller of a rotogravure machine also prints a position or register mark, and this mark, when the paper leaves the second printing roller is sensed by a photoelectric cell which gives a reference signal, that is, a signal indicating the position on the paper of the first monochromatic image. Likewise the second printing roller, besides its monochromatic image, also prints a register mark which, when the paper leaves the second printing roller, is sensed by another photoelectric cell which gives a reaction signal, that is, a signal indicating the position on the paper of the second monochromatic image.

The reference and reaction signals are amplified to provide two pulses; assuming that the two photoelectric cells are perfectly aligned transversely of the direction of paper movement, if the reference and reaction signals are simultaneous, this shows that the two register marks pertaining to the two monochromatic images are accurately aligned transversely.

Thus, the two monochromatic images are in longitudinal register if, in the paper movement direction, the relative positions of the register marks are the same on the two printing rollers. If the reference and reaction signals are not simultaneous, then there is a register error and, at a given speed, the seriousness of this error depends on the phase difference between the signals themselves. Known systems differ in the means employed to detect this error and to actuate correcting devices.

A preferred embodiment will now be described as an example with reference to the accompanying drawings in which:

FIGURE 1 is a perspective view partially in block diagram form of a printing roller and means for correction of longitudinal register error;

FIGURES 2, 3 and 4 are graphs showing register errors; in each the oridnate is millimeters and the abscissa is the number of formats;

FIGURE 6 is a circuit diagram of an oscillator in space;

FIGURE 9 is a circuit diagram of a flip-flop input;

FIGURE 10 is a diagram showing operation of the circuit of FIGURE 9;

FIGURE 11 is a circuit diagram of an error counter;

FIGURE 12 is a circuit diagram of a divisor by four;

FIGURE 13 is a circuit diagram of another counter;

FIGURE 14 is a circuit diagram of a converter;

FIGURE 15 is a diagram showing operation of converters according to FIGURE 14;

Figure 5:
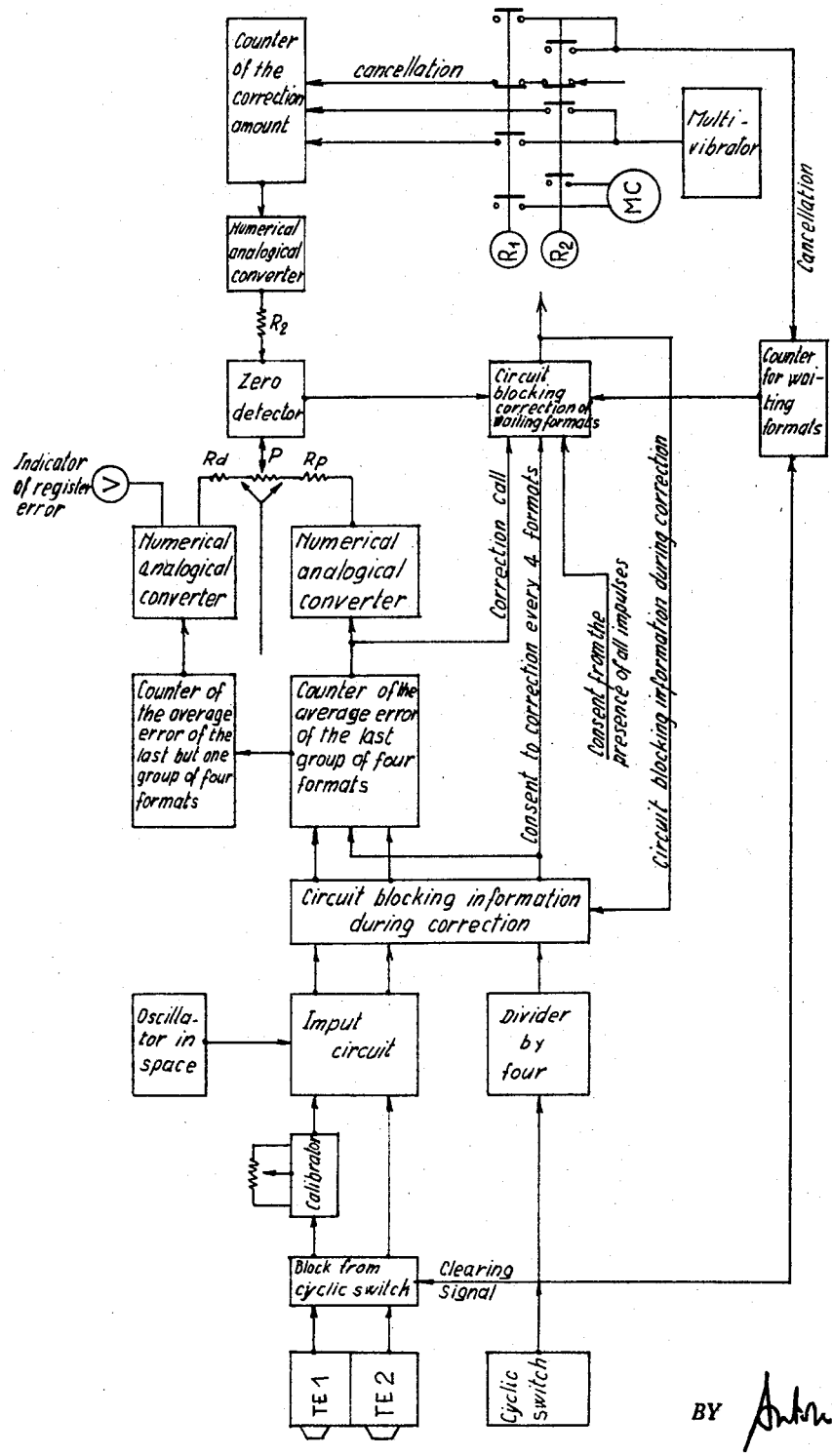
FIGURE 5 is a block diagram of a correcting system.

Briefly stated, the method of the present invention for automatically checking the printing register of a rotogravure machine consists of electronically calculating the average error in two space-adjoining groups of paper formats (the errors resulting from misaligned preprinted register marks), computing a differential value between the two group averages proportional to the speed in variation of the mis-register, and correcting the error as a function of both the magnitude of mis-register and of speed of its variation.

Referring now to FIGURE 1, a paper web or sheet 1, after leaving a first printing roller (not shown) that has printed on the sheet a first mark Ic, is tautened by a stretching roller $T_2$ and then engages a second printing roller $S_2$ which, besides the corresponding monochromatic image, has printed on the sheet a rgeister mark IIc. These marks Ic and IIc are printed on every paper format, and mark Ic is illuminated by a lamp $L_1$ which produces a ray $R_1$ intercepted by a photoelectric cell $CF_1$, the latter producing a signal which is fed to amplifier $A_1$. Similarly mark IIc, by virtue of a lamp $L_2$, a ray $R_2$ and a cell $CF_2$, feeds a signal to amplifier $A_2$.

The two signals are passed to a circuit C for calculating the register error in units of length, according to the phase difference in units of time between the two signals and also according to a voltage, proportional to paper speed, produced by an electric tachometer DT. The result of the calculation is a voltage proportional to the register error and the sign of which depends on the sign of the error. This voltage is fed to a circuit PCR, which, when the error is above a given value (for example 0.1 mm.), causes the actuation of a correction motor MC2 that will move reciprocally according to the sign of the register error and for a time proportional to the error itself to provide a requisite correction movement. After a correction operation, the circuit PCR remains inactive for a given number of formats until the correction introduced becomes effective: this avoids overcorrection.

The motor MC2 acts on the stretching roller T2 to change the paper path between the first and the second printing rollers and hence corrects the relative position of the first two monochromatic images.

Nevertheless, if for example by reason of an engraving defect on a roller (for example on the second roller $S_2$) there is a positional error in the longitudinal direction between the monochromatic image and the register mark (for example an error of 0.5 mm.) automatic checking using transversely aligned marks would introduce a register error between the first two images of 0.5 mm.

To avoid this a circuit $Cb$ makes it possible to use reference and reaction marks now aligned transversely: the phase displacement in this case is spatial and therefore the calibration device has its scale marked with $\pm$ mm. and $\pm$ tenths of mm.

Also, a part of the checking means, a cyclic switch IC to which is imparted rotation of the roller $S_2$ so that there is a turn of cyclic switch IC for every turn of the printing roller $S_2$, and the switch IC masks the two photoelectric cells so that they sense only when the register marks pass in front of them; this prevents correction by spurious printing signs.

A device as above described assures the automatic checking of the register of the second monochromatic image with respect to the first: a complete register checking requires as many such devices as there are colors or sections of the rotogravure machine.

Let us assume, for example, that the natural variation of error (i.e. without correction) is as shown in FIGURE 2 and that the correction made, proportional to the error, becomes effective after ten formats.

When the correction is made, the error is as shown in FIGURE 3. It is clearly an improvement, but according to the invention a better result is obtained by making a correction that is a function of the value of the error and of the value of the curve slope of FIGURE 2; thus at every correction it can be calculated what will be the residual error after the number of formats necessary for the correction to have become effective, and this residual error can then itself be corrected.

Assuming that E is the error at the point considered and that $$p = \frac{E}{f}$$

the slope of the natural error curve (FIGURE 2); the correction made over 10 formts is: $E_c = E + 10.p$. In this case the variation of the corrected error is shown in FIGURE 4.

FIGURE 5 is a block diagram of a circuit for carrying out a correction of the kind referred to above. The value $p$ of the slope must be determined accurately: hence this value is obtained from the average values of errors obtained from a great number of successive measurements.

The obtained errors are averages, for example, every four formats and at every fourth format the average is transferred into memory.

If the average error during the last four formats is greater than for example 0.1 mm. a correction of a value proportional to $$E + K(E - E_m) = E(1+K) - KE_m$$

takes place, E being the average value of the error in the last four formats and $E_m$ the average value (in memory) of the error in the last but one group of four formats.

During correction the information signals are stopped so that the apparatus maintains the term $E(1+K) - KE_m$ and the correction is maintained until its value reaches $E(1+K) - KE_m$. Thus, during the waiting formats following every correction, while the apparatus cannot execute corrections, signals from the cells are not used so that at the end of the waiting formats the apparatus can be ready to make a correction, if necessary.

Components of FIGURE 5 will now be discussed in some detail.

The "oscillator in space" is simply a pulse generating circuit which is controlled by the tachometer DT (to allow for varying paper speeds) and produces a pulse every 0.05 mm. of the paper path.

The electric head TE has two photoelectric cells and amplifiers $TE_1$ and $TE_2$: one cell senses the reference register mark and gives the respective signal; the other cell senses the reaction register mark and gives the respective signal.

The cyclic switch IC normally masks or blocks the photoelectric cells allowing them to sense only when the register marks are passing them, the cyclic switch giving a clearing signal at every format. This switch also numbers the formats.

The calibrator $Cb$ changes the time at which the reaction signal enters the device and hence imposes operation with register signs not aligned.

The input circuit admits the pulses from the circuit of the oscillator included between the two reference and reaction signals directing them to output 1 or to output 2 according to which signal (of reference or of reaction) arrives first: therefore the number of pulses passing to the output 1 or to the output 2 gauges the register error to 0.05 mm.: the presence of pulses on the output 1 or 2 gives information about the sign of the error.

The circuit for blocking signals during correction prevents pulses from reaching the error counter during a correction operation.

The counter of the average error of last 4 formats is a counter of digital type that numbers and sums the pulses corresponding to 4 formats and therefore the number it reaches after every 4 formats is proportional to the average error in 4 formats: also it takes note of the sign of the error.

The divider by 4 numbers the pulses from the cyclic switch IC and at every 4 pulses it gives an output pulse which orders the transfer into memory and the resetting of the counter of average error.

The counter of average error of the last but one group of 4 formats is analogous to the first counter of average error and it receives its contents at every four formats and it is controlled by the divider by 4.

The numerical analog converter for the first counter is formed by a number of flip-flop circuits (they are circuits with 2 positions, one the rest position and the other the working position).

The number showing the contents of the converter depends on the position of a flip-flop indicated numerically. Thus, the number 0 indicates the rest position and the number 1 the working position. The numerical analog converter changes the number contained in the counter at a voltage proportional to the number.

The numerical analog converter for the second counter is analogous to the first converter and the voltage output of the converter serves also to feed the error indicator V.

The circuit of the term $E(1+K) - KE_m$—the voltage output of the converter relative to the error of the last formats represent the term $E_m$: at the output of the circuit formed by the resistances $R_p - R_e - P$, the voltage is proportional to the term $E(1+K) - KE_m$.

When the register error or the counter contents for four formats passes a given value, the correction circuit through the relays $R_1$ and $R_2$ operates correction motor MC. Thus, the correction circuit can operate after every 4 formats. The correction sign is determined by a circuit that will be described below.

The multivibrator is a circuit oscillating at a given frequency: the correction speed of the motor being constant, every pulse from the multivibrator corresponds to a given correction, for example of 0.1 mm.

The counter of the correction amount: the output pulses from the multivibrator during the correction phase (the relay $R_1$ or $R_2$ being shut) are counted from the counter of the correction amount and the contents of this counter measure the amount of the correction.

The numerical analog converter is for the counter of the correction amount and is similar to the other two converters, its output voltage Ec being proportional to the amount of the correction made.

The zero detector is fed by the voltage $$E(1+K) - E_mK - E_c$$

and when this voltage is zero, the amount of the correction made is equal to the amount of the required correction. The zero detector then stops the correction operation.

At the beginning of every correction operation the zero detector senses the sign of the voltage $E(1+K) - E_mK$ and determines the direction of the correction, that is, which of the relays $R_1$, $R_2$ is to be energized.

At the end of every correction the contents of the counter of the correction amount are cancelled.

The counter of the waiting formats: at the end of every correction the contents of this counter are annulled and the calculation of the formats or turns of the cyclic switch begins.

During this phase the device can make no corrections. After the counter has numbered a given number of formats, it permits a correction if this is required. The circuit diagrams will now be described.

The oscillator in space (FIG. 6) comprises a flip-flop (which includes transistors 1 and 2 and collector resistances $R_1$ and $R_2$ with resistors $R_{1p}-R_{2p}$ for transistor basis polarization) and two integrators (transistors 3 and 4, collector resistances $R_3$ and $R_4$ and integration condensers $C_3$ and $C_4$.) When the flip-flop is in a given position (for example transistor 1 conducting and transistor 2 nonconducting) the transistor 3 is conducting and transistor 4 is nonconducting. The condenser $C_4$ is charged by integration of the voltage of the tachometer. Therefore the voltage of the condenser $C_4$ measures the product of paper speed and time. When this voltage is greater than the voltage on the Zener diode $Z_4$, it causes the flip-flop to pass to the other stable position with transistor 1 non-conducting and transistor 2 conducting; consequently the transistor 3 is nonconducting while the transistor 4 becomes conducting, shorting out the charge on condenser $C_4$.

The integration condenser $C_3$ is charged by integration of the voltage of the tachometer until it causes the flip-flop to charge as above described, and so on.

Every charge of the flip-flop corresponds to a given travel of the paper for example 0.05 mm.

Figure 7:
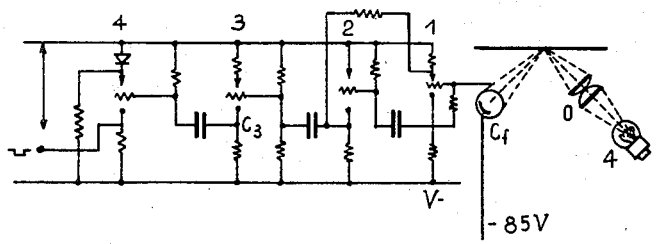
FIGURE 7 is a circuit of an electric sensing head.

The electric sensing head TE (FIGURE 7) comprises two channels: one to inspect the reference signal and the other to inspect the reaction signal. Only one circuit for one channel is given. A lamp 4 with a lens 0 illuminates the zone of the paper corresponding to the path of the marks and the photoelectric cell $C_f$. The signal from the photoelectric $C_f$ is fed to the base of a transistor 1 of a transistor amplifier 1-2-3 of known design; the signal from the transistor 3 at point $C_3$ is fed to the base of a transistor 4; usually this transistor is non-conducting because its emitter is polarized negatively by the diode shown; it is in conduction when the next signal arrives from transistor 3 and so converts this signal to square wave form, as indicated.

The cyclic switch is formed for example by a contact: when this is closed it feeds for example the photoelectric cells so that they can sense; closing of this contact takes place only in correspondence with the passage below the sensing head of the register marks.

Figure 8:
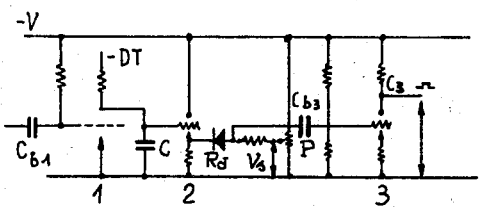
FIGURE 8 is a circuit diagram of a calibrator.

The calibrator (FIG. 8) is formed by the transistor 1 usually conducting because it has its base polarized negatively by resistance $R_{b1}$.

When a signal is received from one channel of the electric sensing head through the condenser $C_{b1}$ the transistor 1 is rendered non-conducting and the condenser C integrates the voltage of the tachometer to a voltage proportional at every instant to the travel of the paper, starting from the point where the input signal is received at the circuit (that is, from a register signal). The transistor 2, arranged as a cathode follower, repeats as its output voltage the voltage of the condenser C; when this passes a value $V_s$ determined by a potentiometer P, a rectifier $Rd$ begins to conduct.

Thus, the rectifier $Rd$ begins to conduct after a given travel of the paper from a register mark, the commencement of conduction being by the potentiometer P.

The pulse from the commencement of conduction is fed by the condenser $C_{b3}$ to the base of the transistor 3 and it is amplified and converted to square wave form by this transistor.

The phase of the start of the output voltage tension of transistor 3 (at point C3) is adjustable by the potentiomer P in correspondence with the start of the input voltage or with the register mark on the paper.

Referring to FIGURE 9, the input circuit comprises two flip-flops. As in the following description many flip-flops are used. In FIGURE 9 a diagram of a flip-flop is shown, and later its working is illustrated. Let us assume that the flip-flop is in position 0, or reset position, that is the transistor 1 is non-conducting and the voltage at point A is —V, and the transistor 2 is conducting and the voltage at point A is 0. Assume also that the voltage at the reset point is —V and the voltage at the net point is =0 and that on the clock point a voltage pulse of amplitude +V is applied; then the voltage at the point $a$ becomes positive while the voltage at the point A cannot become positive; the rectifier $R_a$ begins to conduct and makes the transistor 2 non-conducting; this last makes the transistor 1 pass to conduction and the flip-flop goes to the position 1 or set position.

Analogously if the set voltage is —V and the reset voltage is 0, a positive voltage pulse on the clock causes the return of the flip-flop to position 0 or reset position.

If both set or reset voltages are —V a pulse on the clock does not change the position.

Referring now to FIGURE 10, let it be assumed that both flip-flops are in reset position: the clock of the first flip-flop is fed by the pulse from the first channel of the sensing head through the calibrator circuit and the clock of the second flip-flop is fed by the pulse from the second channel of the sensing head. Before receiving the pulse, the two flip-flops are in reset position and so the voltages at the points A and $\overline{A}$ of the flip-flops are those shown.

The points I and II, because of the rectifiers $RI_A$, $RI_{\overline{A}}$, $RII_A$, $RII_{\overline{A}}$, at the value of the more negative voltage at the points A of the flip-flop 1 and $\overline{A}$ of the flip-flop 2, and A of the flip-flop 2 and $\overline{A}$ of the flip-flop 1 respectively sum up as indicated in FIGURE 10.

When the signals are received from the first and second channels, for example in the succession shown in FIGURE 10 (a register error such as to cause a signal in the second channel lagging in regard to that of the first channel) they change to the set position respectively flip-flop 1 and flip-flop 2, the voltages at points A and $\overline{A}$ become those shown in FIGURE 10. The voltages at points I and II are also shown in FIGURE 10. In conclusion the voltage at points I and II is usually negative; the voltage at point I is zero in the interval between the arrival of the signals of the first and second channels; similarly the voltage at point II is zero in the interval between the arrival of the signal of the second channel and that of the first channel (a register error of a sign opposite to the previous one). In the following description, for clarity, it will be assumed that the register error is such as to cause a signal first on the first channel and then on the second channel.

Referring to FIGURE 11, the counter of the average error of the last four formats is formed by two counters, the first for counting the errors in one direction and the other in the other direction. FIGURE 11 is a diagram of a counter for numbering the errors in the first direction. This counter comprises a number of flip-flops corresponding to the greatest number to be counted. Every flip-flop has a reset point R connected to a point A and a set point S connected to a point $\bar{A}$: The clock of every flip-flop is connected to the point $\bar{A}$ of the preceding flip-flop.

Also to the points R and S of the first flip-flop there is fed the voltage of point I of FIGURE 10.

Thus the set and reset voltages of the first flip-flop are negative when the voltage of point I is negative and the counter cannot act even if positive pulses arrive at the clock of the first flip-flop.

On the other hand when the voltage of point I is zero, the counter can count the pulses on the clock. At the beginning all the flip-flops of the counter are in reset position or zero position; when the first pulse arrives at the clock the flip-flop 1 changes to the set or 1 position; when the second pulse arrives at the clock flip-flop 1 changes to zero position but the positive pulse on $\bar{A}$ of the flip-flop 1 causes the flip-flop 2 to change to the 1 position, and so on; when the successive pulses arrive the flip-flops are arranged as shown in FIGURE 11; the number of pulses counted by the counter at the end of the calculation is deduced by the state of every flip-flop according to FIGURE 11. At the end of every fourth format the counter has summed up the register errors in those four formats; the sum is proportional to the register average error in the four formats. After every fourth format the counter is cancelled bringing all the flip-flops to zero position; for this reason the emitter circuits of the transistors, which in zero position are non-conducting, are opened for an instant by reset transistors.

Referring to FIGURE 12, the divider by four is formed by one counter with two flip-flops. The cyclic switch feeds a positive voltage pulse to the clock. The working of this counter is identical to that previously described.

After every four runs of the cyclic switch both flip-flops change to the zero position. The voltage at point 0 is normally negative and becomes zero after every fourth format when the two flip-flops are both in 0 position.

At point I there is a positive voltage pulse at every four formats, and this pulse, applied to the base of the reset transistor of the counter of FIGURE 11, cancels that counter after every four formats.

Referring to FIGURE 13, the counter of the average error of the last but one group of four formats is formed by two counters, one for errors in one direction and the other for errors in the opposite direction.

Each counter is formed by as many flip-flops as are the flip-flops of every counter of FIGURE 11.

All the flip-flops every four formats receive from point I of FIGURE 12 a positive signal on the clock and therefore they repeat the position of the corresponding flip-flop of the counter of FIGURE 11.

FIGURE 14 shows the numerical analog converter for a counter according to FIGURE 11. This counter comprises as many pairs of transistors in series as there are flip-flops of the counter of FIGURE 11.

If the flip-flop is in the 0 position transistor 1 is conducting and transistor 1' is non-conducting; if the flip-flop is in the 1 position transistor 1' is conducting and transistor 1 is non-conducting; in the first case the voltage at point 1 is zero and in the second case it is —V.

If all the flip-flops of the counter are in zero position the voltage at point I is zero, and if all the flip-flops of the counter are in 1 position the voltage at point I is —V: to intermediate conditions of the flip-flops correspond intermediate voltages at point I. The voltage at point I is proportional to the average error E in the last four formats.

The second numerical analog converter is similar to that just described and it is controlled by the second counter, that is, the counter of FIGURE 13.

The voltage of its output at point I, is proportional to the average error $E_m$ of the last but one group of four formats.

Referring to FIGURE 15, which shows the circuit for the output, points I of the two converters are connected as shown. The voltage at point II is $E(1+K)-E_mK$: the value of K depends on the value of the resistances $R_p$, $R_D$ and P.

By means of the potentiometer P it is possible to regulate the value of K.

Figure 16:
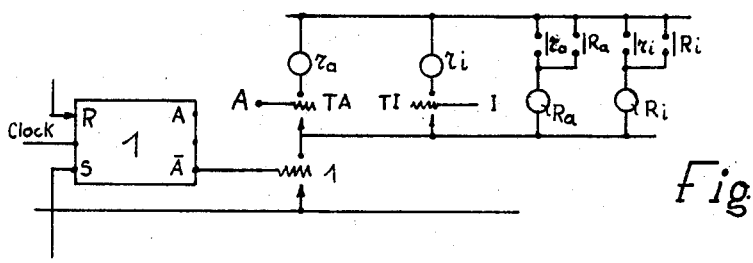
FIGURE 16 is a circuit diagram of the correction circuit.

FIGURE 16 shows the correction circuit which is formed by a flip-flop usually in the reset position.

The voltage at the set point is usually negative and becomes zero when at the same time the following conditions are satisfied at every four formats at point C of the circuit of FIGURE 12, viz. error B greater than a given value from the counter of FIG. 11; and apparatus not in the waiting format phase.

In these conditions, when a signal is fed to the clock from the cyclic switch, the flip-flop changes to the set position and causes the normally non-conducting transistor 1 to conduct according to the voltage at points A or I it is possible to excite relay $r_a$ or $r_1$ which through relay $R_a$ or $R_1$ makes the correction in one direction or the other.

Figure 17:
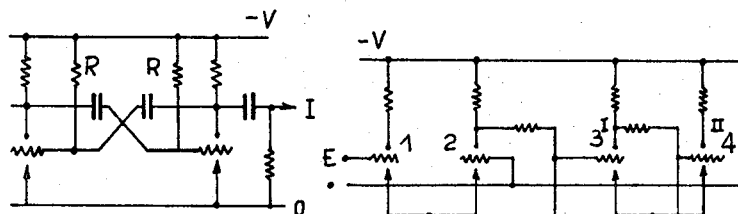
FIGURE 17 is a circuit diagram of a multivibrator.

The circuit of the multivibrator is shown in FIGURE 17. The voltage at point I has positive and negative pulses at a frequency depending on the values of $R_c$ and C.

The circuit is such that in the interval between two successive positive pulses, the correction motor makes a correction of 0.1 mm.

The counter of the correction amount is a counter similar to that shown in FIGURE 11: it counts the positive pulses of the multivibrator during the correction phase when relay R1 or R2 is shut.

The numerical analog converter for the counter of the correction amount is similar to the other converters and its output voltage at point I is proportional to the correction introduced by the correction motor.

Figure 18:
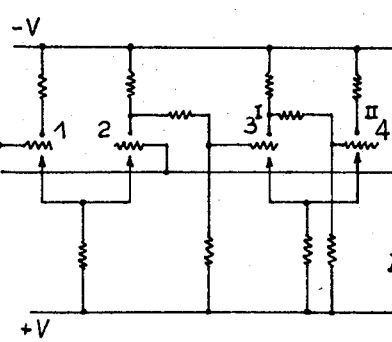
FIGURE 18 is a circuit diagram of a zero circuit.

Referring to FIGURE 18, the circuit of the zero detector comprises two transistors 1 and 2 arranged in known manner as an amplifier with balanced stages and two transistors 3 and 4 arranged in known manner for converting signals to square wave form.

If the input voltage at point E is, for example, negative, the voltage at point I will be zero and at point II it will be —V, while if the input voltage is, for example, positive, the voltage at point I will be —V and at point II it will be zero.

At the moment when the value of the input voltage is nil, going from negative to positive values, or vice versa, the transistors 3 and 4 are suddenly changed over.

The input voltage is supplied from point II, and is summed algebraically with the voltage of the converter of the counter of the correction amount, thus giving: $E(1+K)-E_mK-E_c$=amount of the correction.

At the beginning of a correction the term $E_c$=0 and, therefore, according to the sign of the required correction, that is according to the sign of the term $E(1+K)-E_mK$, the squaring circuit, transistors 3 and 4 puts itself in one position or in the other.

At the end of a correction the term $$E(1+K)-E_mK-E_c=0$$

and therefore the squaring circuit changes its position.

The position of the squaring circuit chooses the correction sign, and the position change of the squaring circuit determines the end of a correction.

Points I and II of the squaring circuit feed points A and I (FIGURE 16); therefore when a correction is required, either relay $r_a$ or $r_1$ and $R_a$ or $R_1$ is excited according to the position of the squaring circuit. Assuming therefore that there is an error in the direction of excitation of relay $r_a$: this excites relay $R_a$ and the correction in a direction begins.

At the end of the correction the relay $r_1$ is excited and the relay $r_a$ is released: the condition relays $r_1$ and $R_a$ excited causes reset of the flip-flop of the circuit of FIGURE 16 which, rendering transistor 1 non-conducting, releases all the relays and causes the end of the correction.

The waiting formats counter in a normal counter with 3 flip-flops of the type described with reference to FIGURE 11.

During the correction all the flip-flops are put in 0 position: at the end of the correction the cyclic switch operates and after 7 operations, when all the flip-flops change to the 1 position it gives a clearing signal to the correction circuit, point 0, to request a new correction if necessary.

What is claimed is:

1. A method for checking longitudinal register in a rotogravure printing machine, wherein register marks are printed on the paper web by the printing rollers and are subsequently photoelectrically detected, compared and if mis-registered automatically realigned, characterized by detecting a register error at every format of the paper; automatically calculating the average value in a last group of detected errors, as well as in another group of detected errors positioned in time next to said last group; computing the error differential between the two average values, so as to obtain a value proportional to the speed in variation of the mis-register; the aforementioned steps resulting in the automatic correction of the mis-register; which correction is a function of both the magnitude of the mis-register and of the speed of variation thereof.

2. The method of claim 1, characterized in that electric pulses are generated one at each predetermined length of travel of the paper web by means of the electric circuit of a cyclic switch controlled by a tachometer proportionally to the speed of movement of the paper web and in that said pulses are passed during the time interval between the reference signal and the reaction signal (relative to the photoelectrically detected register marks) to a first channel or to a second channel of a flip-flop input circuit and are counted so as to obtain a register error expressed in multiples of said length of travel of the paper web.

3. The method of claim 2, characterized in that said pulses are integrated by means of a calibrating circuit, said integration having a predetermined limit value corresponding to said length of travel of the paper web, and in that the time interval is determined for the integration to reach said limit value and the reference signal or the reaction signal of said time interval is misphrased, so that the correction of a mis-register is not effected when the register marks on the paper web are displaced with respect to each other by an amount equal to said limit value.

4. Apparatus for checking and correcting longitudinal mis-registers in a rotogravure printing machine, which comprises in combination:

(a) an electric sensing head having two photoelectric cells and relative amplifiers, one of said cells sensing a first register mark and emitting a reference signal and the other of said cells sensing a second register mark and emitting a reaction signal;

(b) a cyclic switch which masks said photoelectric cells at all times except when said register marks are passed in front of said cells and which generates a pulse at every format of the paper, so as to allow the formats to be numerically counted;

(c) an oscillator controlled by a tachometer having voltage proportional to the speed of the paper web, said tachometer generating a series of pulses such that the distance between the peaks of any two pulses is constant;

(d) a flip-flop input circuit having channels for the passage therethrough of said cyclic switch pulses during the time interval between reference signals and reaction signals;

(e) a first counter for the average error in register during the last four formats, said counter being a digital-type counter capable of adding the number of pulses corresponding to four formats;

(f) a divider by four which counts the pulses originating from said cyclic switch and generates at every four such pulses a signal which actuates a memory circuit and cancels the contents of said first counter;

(g) a second counter for the average error in register during the four formats next to said last formats, said counter being also a digital-type counter capable of receiving the contents of said first counter upon actuation by said divider by four and of retaining into memory said contents;

(h) a pair of numerical analog converters for changing the content value of said first an second counters into a voltage proportional to said value;

(i) an adding voltage circuit consisting of a potentiometer fed by said converters and capable of supplying a voltage which is a linear function of the output voltages of said two converters;

(j) a correction circuit which actuates a correcting motor by means of a pair of relays when the contents of said first counter exceed a predetermined value, the correction occurring in either direction depending on which of said two relays is actuated upon;

(k) a multivibrator which generates constant pulses, each of which corresponds to a predetermined correction value;

(l) a third counter for the amount of correction required, which counts the pulses generated from said multivibrator during the correction phase;

(m) a third numerical analog converter for changing the number counted by said third counter into a voltage proportional to said number;

(n) a zero point detector which at the beginning of each correction detects the voltage sign generated from said adding circuit and energizes one of said two relays of said correction circuit, and during said each correction detects the differential voltage between the output voltage of said adding circuit and the output voltage of said third numerical analog converter, said zero point detector terminating the correction when said differential voltage is nil and cancelling the contents of said third counter after each correction, said zero point detector comprising also blocking means to prevent during a correction that the pulses originated from said oscillator pass to said first counter; and (o) a fourth counter for the waiting formats for counting the formats during the time interval required by a mis-register correction.

5. The apparatus of claim 4 in which said oscillator is controlled by a tachometer which measures the linear velocity of the tape and is capable of oscillating inversely proportionally to said linear velocity.

6. The method of claim 2 wherein the correction of a mis-register is effected as a function of the difference in position between the two register marks modified by subtracting from said difference a fixed quantity value expressed in units of time.

7. The method of claim 1, characterized in that the mis-register correction is interrupted when any one of the errors to be detected in the last group of formats or in the next to the last group of formats is absent.

8. The apparatus of claim 4, characterized in that it is provided with an electrical circuit comprising a potentiometer, an integrating squaring circuit to integrate the voltage of the tachometer from the time the photoelectric cell's impulse is received thereby to the time the predetermined limit value is reached.

References Cited

UNITED STATES PATENTS

| | | | |
|---|---|---|---|
| 2,348,862 | 5/1944 | Sorkin | 250—219 |
| 2,768,827 | 10/1956 | Noble | 250—219 |
| 2,840,371 | 6/1958 | Frommer | 250—219 |
| 2,840,372 | 6/1958 | Alhand | 250—219 |

RALPH G. NILSON, *Primary Examiner.*

M. ABRAMSON, *Assistant Examiner.*